United States Patent
Seetharaman et al.

(10) Patent No.: US 11,184,286 B2
(45) Date of Patent: Nov. 23, 2021

(54) METHOD AND SYSTEM FOR ADAPTIVE AND CONTEXT-AWARE SERVICE FUNCTION CHAINING IN COMMUNICATION NETWORKS

(71) Applicant: WIPRO LIMITED, Bangalore (IN)

(72) Inventors: Swaminathan Seetharaman, Chennai (IN); Ravi Kumar Emani, Bangalore (IN)

(73) Assignee: Wipro Limited, Bangalore (IN)

( * ) Notice: Subject to any disclaimer, the term of this patent is extended or adjusted under 35 U.S.C. 154(b) by 569 days.

(21) Appl. No.: 15/818,885

(22) Filed: Nov. 21, 2017

(65) Prior Publication Data

US 2019/0104076 A1  Apr. 4, 2019

(30) Foreign Application Priority Data

Sep. 29, 2017 (IN) .............................. 201741034771

(51) Int. Cl.
*H04L 12/859* (2013.01)
*H04L 12/715* (2013.01)
(Continued)

(52) U.S. Cl.
CPC ........ *H04L 47/2475* (2013.01); *H04L 45/306* (2013.01); *H04L 45/38* (2013.01);
(Continued)

(58) Field of Classification Search
CPC ... H04L 47/2475; H04L 45/306; H04L 45/38; H04L 47/17; H04L 45/64
(Continued)

(56) References Cited

U.S. PATENT DOCUMENTS 9,491,094 B2  11/2016  Patwardhan et al.
9,559,970 B2  1/2017  Kumar et al.
(Continued)

FOREIGN PATENT DOCUMENTS

KR  10-2017-0000787  1/2017

OTHER PUBLICATIONS

Sameer Kulkarni, "Neo-NSH: Towards scalable and efficient dynamic service function chaining of elastic network functions", Apr. 17, 2017, IEEE, 5 pages.*
(Continued)

*Primary Examiner* — Vivek Srivastava
*Assistant Examiner* — Hien V Doan
(74) *Attorney, Agent, or Firm* — Finnegan, Henderson, Farabow, Garrett & Dunner, LLP

(57) ABSTRACT

A technique is provided for adaptively performing service function chaining based on network context. The technique includes receiving a request comprising a flexible SFC template (FST) for provisioning an SFC of a plurality of service functions (SFs). A service function path (SFP) is determined responsive to receipt of data packets corresponding to a pre-defined flow to be transmitted over the network. Monitoring of a pre-defined plurality of parameters associated with the SFP and a network context is performed after implementing the SFP. Based on the monitoring of the pre-defined plurality of parameters and SFP modification criteria, a requirement for modifying the SFP is identified. Responsive to the identification, the SFP is modified and the performance of the modified SFP is monitored based on one or more of the plurality of parameters, a network context after modifying the SFP, and a pre-defined plurality of service performance thresholds.

15 Claims, 5 Drawing Sheets

Network Environment 100

(51) Int. Cl.
*H04L 12/725* (2013.01)
*H04L 12/721* (2013.01)
*H04L 12/801* (2013.01)
*H04L 12/727* (2013.01)
*H04L 29/08* (2006.01)

(52) U.S. Cl.
CPC .............. *H04L 45/64* (2013.01); *H04L 47/17* (2013.01); *H04L 45/121* (2013.01); *H04L 45/70* (2013.01); *H04L 47/12* (2013.01); *H04L 67/2814* (2013.01)

(58) Field of Classification Search
USPC .......................................................... 709/223
See application file for complete search history.

(56) References Cited

U.S. PATENT DOCUMENTS

2013/0272305 A1 10/2013 Lefebvre et al.
2016/0119253 A1 4/2016 Kang et al.
2016/0182385 A1* 6/2016 Kumar .................... H04L 45/12
370/235

OTHER PUBLICATIONS

Seungik Lee, "Service Function Path Adaptation in SFC", Mar. 30, 2017, ICACT, 3 pages.*
Kulkarni, S., et al., "Neo-NSH: Towards Scalable and Efficient Dynamic Sevice Function Chaining of Elastic Network Functions", (2017), IEEE, pp. 308-312.
Lee, S., et al., "Service Function Path Adaptation in SFC", (2017), ICACT, pp. 510-513.
Lee, E., et al., "SFC dynamic instantiation draft-lee-sfc-dynamic-instantiation-01", (2014), ISOC, pp. 1-9.
Medhat, A., et al., "Resilient Orchestration of Service Functions Chains in a NFV Environment", (2016), IEEE, pp. 7-12.
Extended European Search Report issued in the European Patent Office in counterpart European Application No. 17209573.9, dated Jun. 18, 2018, 10 pages.

* cited by examiner

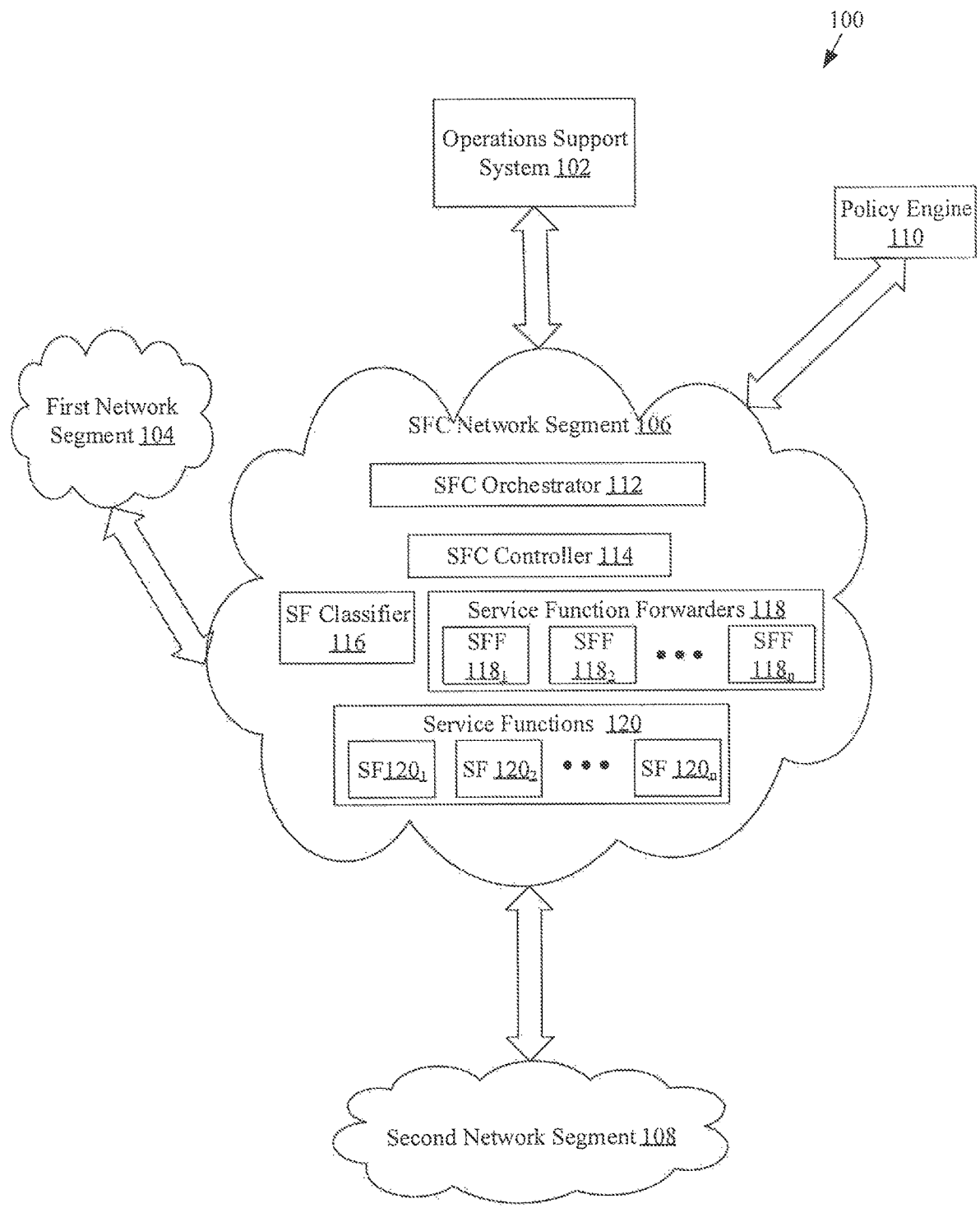
FIG. 1: Network Environment 100

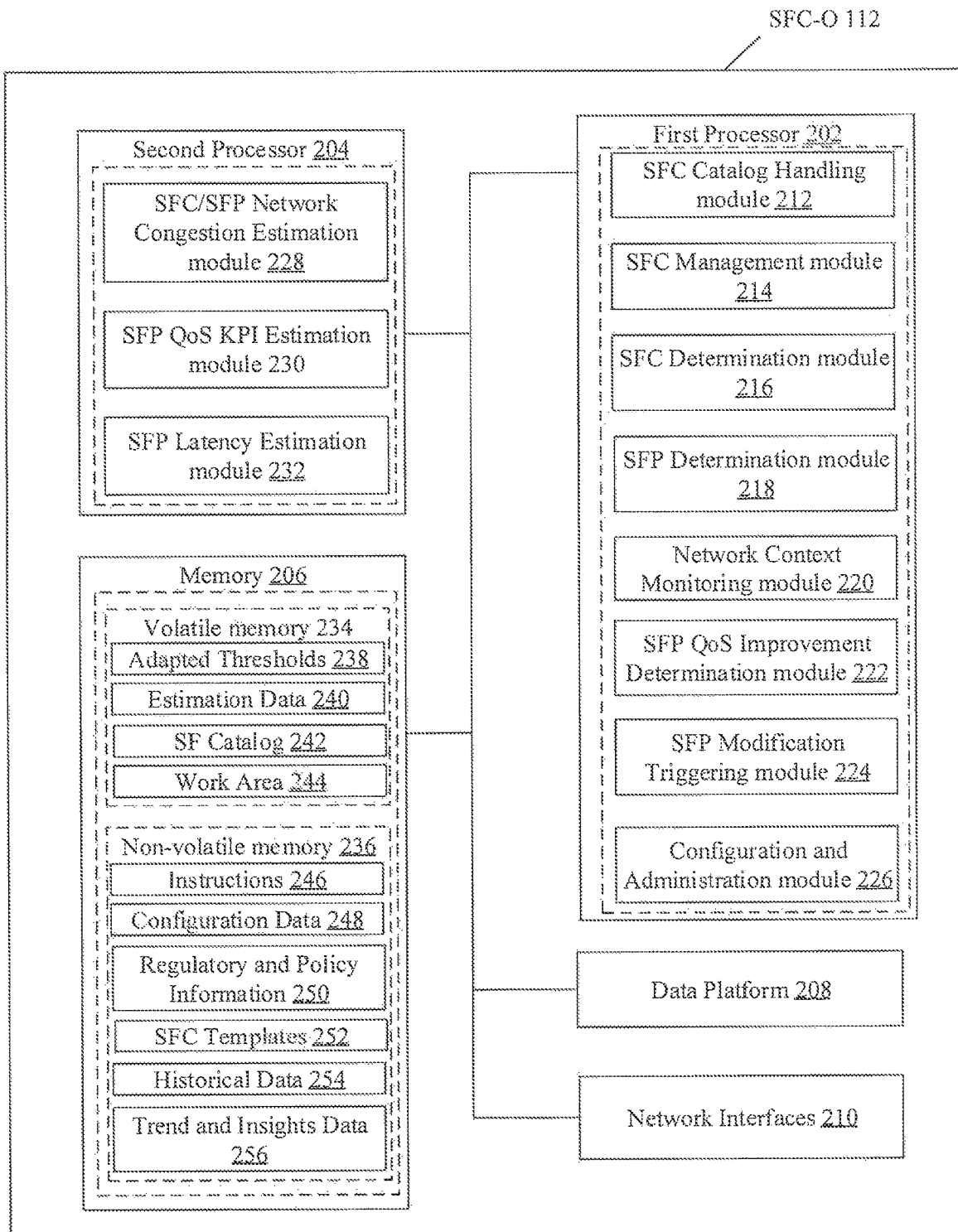
FIG. 2: Service Function Orchestrator 112

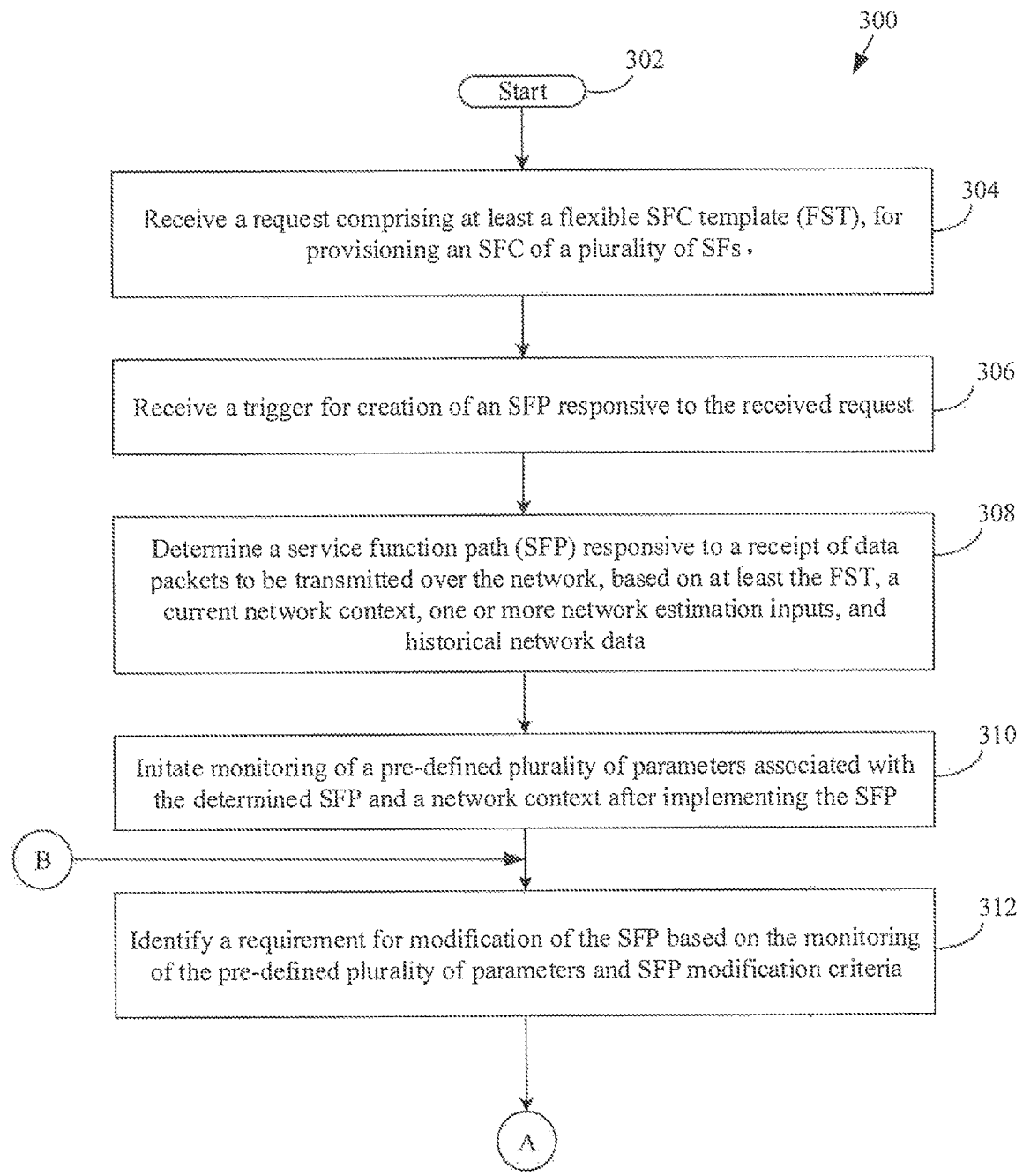
FIG. 3A: Method 300 for adaptively performing service function chaining based on network context

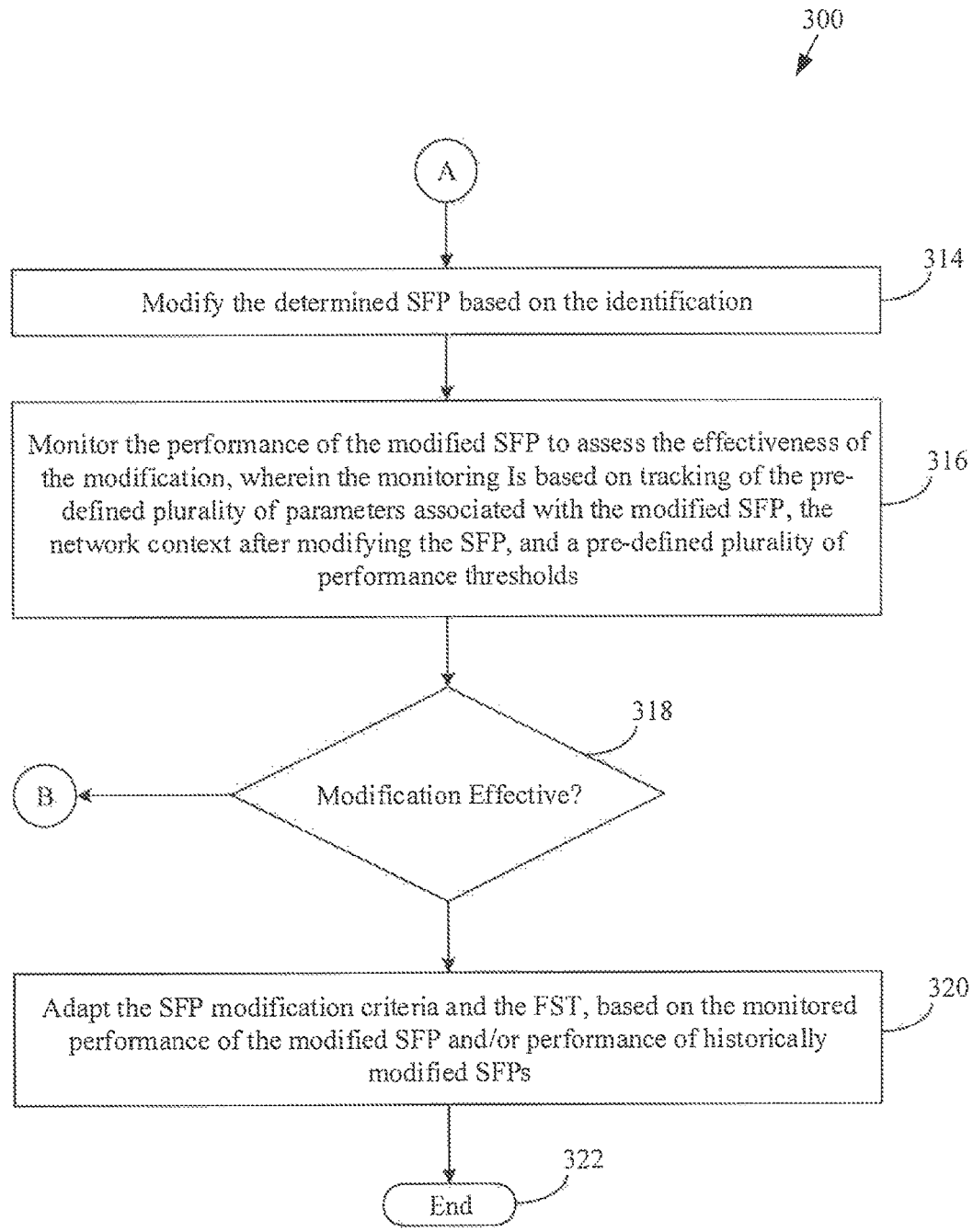
FIG. 3B: Method 300 for adaptively performing service function chaining based on network context

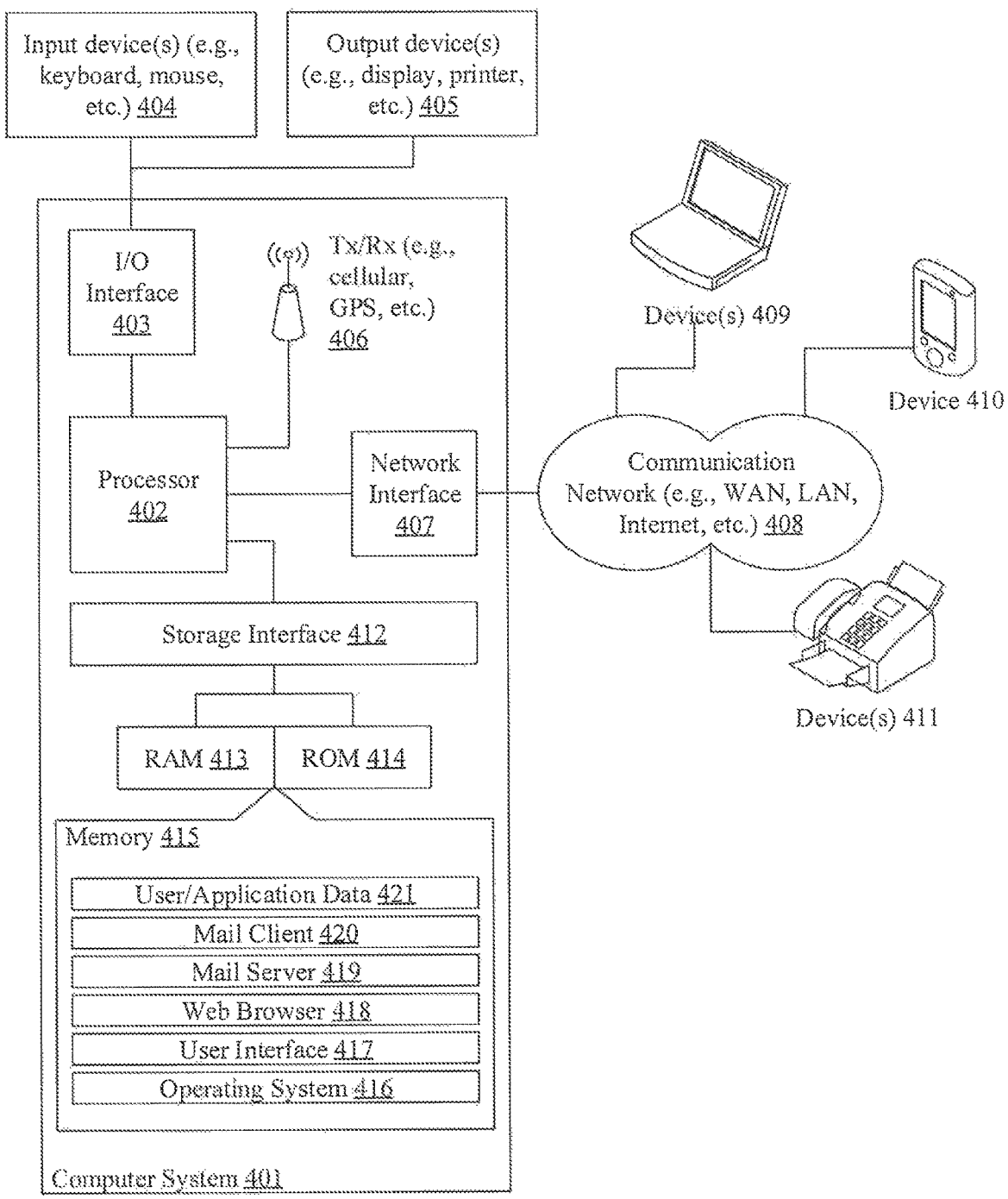
FIG. 4: Example Computer System

METHOD AND SYSTEM FOR ADAPTIVE AND CONTEXT-AWARE SERVICE FUNCTION CHAINING IN COMMUNICATION NETWORKS

TECHNICAL FIELD

This disclosure relates generally to service function chaining of service functions, and more particularly to system and method for performing adaptive and context-aware service function chaining in communication networks.

BACKGROUND

Providing services in communication networks entails end-to-end delivery of data packets via an ordered set of service functions (SFs). Such an ordered set of SFs is instantiated by means of defining a Service Function Chain (SFC). Based on the instantiated SFC, a constrained path, known as a service function path (SFP), may be specified. The SFP defines a path (including a plurality of SFs) through which the network traffic, consisting of data packets, flows.

Recent developments in the field of service function chaining have led to development of dynamic service function chaining methods. Such dynamic methods include service chaining in which incoming packets may be classified and mapped to the appropriate SFC based on the access type, traffic type, and the like. The methods may further enable sharing of metadata across SFs as part of the packet headers to avoid re-classification after every hop (transition from one SF to another) for determining the next hop. Such methods may further enable sharing relevant information, such as a subscriber identity. In such methods, the packet is forwarded to the next SF in the SFP (associated with the SFC) by examining the metadata in the packet header. This forwarding can be done by a service function forwarder (SFF) or by the SFs themselves.

One of the problems with the existing service function chaining methods is that the SFPs are inflexible and are independent of network conditions. Such a service function chaining renders the SFP susceptible to change in network conditions and thereby leads to poor Quality of Service/Experience (QoS/QoX). Furthermore, the existing methods do not enable addition or deletion of SFs from an SFP based on network conditions. This leads to sub-optimal use of the network resources. Other methods of implementing SFC are based on latency between the SFs of an SFC and are aimed at minimizing the inter-SF latency. However, such methods also lead to sub-optimal use of the network resources because there is no provision to add or remove SFs based on network conditions.

Apart from the above, other methods of service function chaining lack considering a network level view while dynamically selecting an SF. They instead rely on an SF making a decision regarding the reception of data from an SFF. Such methods may lead to service disruption or a performance degradation in scenarios when the SF is needed at a future instant. Apart from the aforementioned, the existing methods fail to address the user-service-packet sequencing issues arising out of SFP alteration.

It is therefore desirable to provide a mechanism for service function chaining that takes into consideration prevalent network conditions while maintaining the desired Quality of Service (QoS)/Quality of Experience (QoE) of the user along with efficiently utilizing the network resources.

SUMMARY

In one embodiment, a method of adaptively performing service function chaining based on network context is disclosed. In one example, the method includes receiving a request for provisioning a service function chain (SFC) of a plurality of service functions (SFs). The request may include at least a flexible SFC template (FST). The method further includes determining a service function path (SFP) responsive to a receipt of data packets to be transmitted over the network, based on at least the FST, a current network context, one or more network estimation inputs, and historical network data. The data packets correspond to a pre-defined flow of data packets. The method further includes monitoring a pre-defined plurality of parameters associated with the SFP and a network context after implementing the SFP. The monitoring corresponds to a periodic monitoring or an aperiodic monitoring. The method further includes identifying a requirement for modification of the SFP based on the monitoring of the pre-defined plurality of parameters and SFP modification criteria. The method further includes modifying the SFP responsive to the identification. The method further includes monitoring the performance of the modified SFP based on one or more of the pre-defined plurality of parameters associated with the modified SFP, the network context after modifying the SFP, and a pre-defined plurality of performance thresholds.

In another embodiment, a system for adaptively performing service function chaining based on network context is disclosed. The system includes a processor and a memory communicatively coupled to the processor. The memory stores processor-executable instructions, which, on execution, cause the processor to receive a request for provisioning a service function chain (SFC) of a plurality of service functions (SFs). The request may include at least a flexible SFC template (FST). The processor-executable instructions, on execution, further cause the processor to determine a service function path (SFP) responsive to a receipt of data packets to be transmitted over the network, based on at least the FST, a current network context, one or more network estimation inputs, and historical network data. The data packets correspond to a pre-defined flow of data packets. The processor-executable instructions, on execution, further cause the processor to monitor a pre-defined plurality of parameters associated with the SFP and a network context after implementing the SFP. The monitoring corresponds to a periodic monitoring or an aperiodic monitoring. The processor-executable instructions, on execution, further cause the processor to identify a requirement for modification of the SFP based on the monitoring of the pre-defined plurality of parameters and SFP modification criteria. The processor-executable instructions, on execution, further cause the processor to modify the SFP responsive to the identification. The processor-executable instructions, on execution, further cause the processor to monitor the performance of the modified SFP based on one or more of the pre-defined plurality of parameters associated with the modified SFP, the network context after modifying the SFP, and a pre-defined plurality of performance thresholds.

In yet another embodiment, a non-transitory computer-readable medium storing computer-executable instructions for adaptively performing service function chaining based on network context is disclosed. In one example, the stored instructions, when executed by a processor, cause the processor to perform operations that include receiving a request for provisioning a service function chain (SFC) of a plurality of service functions (SFs). The request may include at least a flexible SFC template (FST). The operations further include determining a service function path (SFP) responsive to a receipt of data packets to be transmitted over the network, based on at least the FST, a current network context, one or more network estimation inputs, and historical network data. The data packets correspond to a pre-defined flow of data packets. The operations further include monitoring a pre-defined plurality of parameters associated with the SFP and a network context after implementing the SFP. The monitoring corresponds to a periodic monitoring or an aperiodic monitoring. The operations further include identifying a requirement for modification of the SFP based on the monitoring of the pre-defined plurality of parameters and SFP modification criteria. The operations further include modifying the SFP responsive to the identification. The operations further include monitoring the performance of the modified SFP based on one or more of the pre-defined plurality of parameters associated with the modified SFP, the network context after modifying the SFP, and a pre-defined plurality of performance thresholds.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 is a block diagram of an exemplary network environment for adaptively performing service function chaining based on network context, in accordance with some embodiments of the present disclosure.

FIG. 2 is a block diagram of exemplary system for adaptively performing service function chaining based on network context, in accordance with some embodiments of the present disclosure.

FIGS. 3A and 3B collectively depict flow diagram of a detailed exemplary process for adaptively performing service function chaining based on network context, in accordance with some embodiments of the present disclosure.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to FIG. 1, an exemplary network environment 100 for adaptively performing service function chaining based on network context is illustrated in accordance with some embodiments of the present disclosure. As will be described in greater detail in conjunction with FIG. 2, the network environment 100 displays a system that may be configured to receive a request for provisioning a service function chain (SFC) of a plurality of service functions (SFs). The request may include at least a flexible SFC template (FST). The system may be further configured to determine a service function path (SFP) responsive to a receipt of data packets to be transmitted over the network, based on at least the FST, a current network context, one or more network estimation inputs, and historical network data. The data packets correspond to a pre-defined flow of data packets. In an embodiment, the data packets may correspond to a voice call, a video session, an audio call, and the like. The system may be further configured to monitor a pre-defined plurality of parameters associated with the SFP and a network context after implementing the SFP. The monitoring corresponds to a periodic monitoring or an aperiodic monitoring. The system may be further configured to identify a requirement for modification of the SFP based on the monitoring of the pre-defined plurality of parameters and SFP modification criteria. The system may be further configured to modify the SFP responsive to the identification. The system may be further configured to monitor the performance of the modified SFP based on one or more of the pre-defined plurality of parameters associated with the modified SFP, the network context after modifying the SFP, and a pre-defined plurality of performance thresholds.

The network environment 100 includes a network of devices (e.g., a computer, a server, a digital device, a router, a modem, a bridge, a switch, etc.) for processing, storing and sending or receiving various data. In an implementation, the network environment 100 may include an operations support system (OSS) 102, a first network segment 104, an SFC network segment 106, a second network segment 108, and/or a policy engine 110. The first network segment 104 and the second network segment 108 may correspond to communication network such a wireless access network (WAN), packet core network such as Long Term Evolution (LTE) evolved packet core network, IP multimedia subsystem (IMS) core network, an Internet Protocol (IP) based network, and the like.

The SFC network segment 106 may include a plurality of elements for adaptively performing service function chaining based on network context. In an implementation, the plurality of elements may include an SFC-Orchestrator (SFC-O) 112, an SFC-Controller 114, a SF classifier 116, a plurality of Service Function Forwarders (SFFs) 118, and/or a plurality of SFs 120. The plurality of SFFs may include SFF $118_1$ to $118_n$ and the plurality of SFs 120 may include $120_1$ to $120_n$.

Each of the computing devices further includes one or more processors and a computer-readable medium (e.g., a memory). The computer-readable storage medium stores instructions that, when executed by the one or more processors, cause the one or more processors to perform data reception and transmission in accordance with aspects of the present disclosure. The computer-readable storage medium may also store various data (e.g., optimal network path, optimal packet size, data packets, current packet size of a node, etc.) that may be captured, processed, and/or required by the network environment 100.

The OSS 102 may include suitable logic, circuitry, interfaces, and/or code for providing inputs for provisioning an SFC of a plurality of SFs 120. Such inputs may include a flexible SFC template (FST), one or more rules and/or one or more thresholds for defining operations of an SFC. The aforementioned inputs may be provided to the SFC-O 112, via the first network segment 104 or the second network segment 108. In an embodiment, the aforementioned inputs may be provided to the SFC-O 112 directly.

The first network segment 104 and the second network segment 108 may include a medium through which the OSS 102, the policy engine 110, and/or the plurality of elements of the SFC network segment 106 may communicate to each other. Examples of the first network segment 104 and the second network segment 108 may include, but are not limited to, the Internet, a cloud network, a Wireless Fidelity (Wi-Fi) network, a Wireless Local Area Network (WLAN), a Local Area Network (LAN), a telephone line (POTS), Long Term Evolution (LTE), and/or a Metropolitan Area Network (MAN). Various devices in the exemplary network environment 100 may be configured to connect to the first network segment 104 and/or the second network segment 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), Zigbee, EDGE, infrared (IR), IEEE 802.11, 802.16, cellular communication protocols, and/or Bluetooth (BT) communication protocols.

The policy engine 110 may include suitable logic, circuitry, interfaces, and/or code for storing and providing one or more policy rules related to management of a lifecycle of an SFC. The stored one or more policy rules may further pertain to scaling the provisioned SFC, and/or selection of SFs for the SFC. Examples of such policy rules include, but are not limited, to instantiating a new instance of a specific SF when the traffic matching the SFC exceeds a certain threshold (for example, packets or sessions per second), selection of the instance of a specific SF (for example, an SF having an interface to Lawful Interception Gateway (LIG)) such that it is in the same geographical area/region as that of the access network (regulatory policy), and the like. The aforementioned one or more policy rules may be provided to the SFC-O 112, via the first network segment 104 or the second network segment 108. In an embodiment, the aforementioned inputs may be provided to the SFC-O 112 directly.

The SFC-O 112 of the SFC network segment 106 may include suitable logic, circuitry, interfaces, and/or code for management of an SF catalogue, tracking the availability status of SFs that are present in the SFC network segment 106. In an implementation the SF catalogue includes details such as SF instances that are active and/or geographical location of the SF instances that are active. The SFC-O 112 may interpret the FST received from the OSS 102 and based on the interpretation, instruct the SFC-Controller 114 to provision an SFC. The SFC-O 112 may determine SFP, providing relevant inputs to the SFC-Controller 114 for programming the SF classifier 116 and one or more SFFs of the plurality of SFFs 118. The SFC-O 112 may monitor the performance of SFPs and modify the SFPs based on the monitoring, and/or perform SFP lifecycle management.

The SFC-Controller 114 of the SFC network segment 106 may include suitable logic, circuitry, interfaces, and/or code for generating one or more instructions for the SF classifier 116 and the one or more SFFs of plurality of SFFs 118 for performing SF chaining. Such instructions may include rules for classifying a packet and mapping it to one or more pre-defined flows, SFP-related instructions, performance and other SFP related data to be reported to the SFC-Controller 114, and the like. The SFC-Controller 114 may transmit information received from one or more SFFs of the plurality of SFFs 118 and/or the SF classifier 116 to the SFC-O 112. In other words, the SFC-Controller 114 may be configured to carrying out relevant control-plane functions for SFC operation.

The SF classifier 116 of the SFC network segment 106 may include suitable logic, circuitry, interfaces, and/or code for classifying packets into a flow based on the instructions received from the SFC-Controller 114 which is, in turn, provided by the SFC-O 112 based on the FST. The classification includes mapping a packet (of a pre-defined flow of packets) to an appropriate SFC based on a plurality of pre-defined factors such as access network type, user category (e.g., enterprise, residential), type of a user (for example an adult, adolescent, and child), application type and requirements, location of the served user, policy requirements, and the like.

The plurality of SFFs 118 may include suitable logic, circuitry, interfaces, and/or code for tracking the flow of packets through a determined SFP. The plurality of SFFs 118 may determine a next hop of the packet of a particular flow based on the SFP. The plurality of SFFs 118 may detect and terminate SFC that have loops. The plurality of SFFs 118 may remove any SFC-related packet headers before sending the packets to any node or a network that is beyond the SFC (outside the domain of the SFC). The plurality of SFFs 118 may report SFP related performance and other data to the SFC-Controller 114. The plurality of SFFs 118 may perform load balancing for the plurality of SFs 120.

The plurality of SFs 120 may include suitable logic, circuitry, interfaces, and/or code for performing one or more network functions such as, one or more function relating to Firewall (selectively block certain type of traffic, traffic coming from certain IP addresses, and the like.) Network Address Translation (NAT), video optimization, Transfer Control Protocol (TCP) optimization, content caching, Packet Gateway (PGW) functions, Serving Gateway (SGW) functions, Deep Packet Inspection (DPI), web content filtering, parental controls, encryption, and the like. The plurality of SFs 120 may be physical network entities (NEs) or virtual NEs. The plurality of SFs 120 may be configured to process the packets normally, however in case the SFs correspond to SFC-aware SFs, the SF may modify the SFC-header in the packet. In an implementation, the SFC-aware SFs may correspond to SFs that are aware of application of SFC, and consume and/or modify information shared in SFC-related packet headers in the packets. In other words, they are able to handle packets containing SFC headers. Such SFs may be in accordance with IETF RFC 7665 "Service Function Chaining (SFC) Architecture". In another embodiment, the SFC-aware SFs may be apprised that SFC-related information that is conveyed using proprietary mechanisms (for example, SFC-related information) may be transported using some unused fields or extensions in Internet Protocol (IP) or Transmission Control Protocol (TCP) headers. In any other case, an SF of the plurality of SFs 120 may retain the SFC-header in the packet when sending it back to an SFF of the plurality of SFFs 118. In case the SFs correspond to SFC-unaware SFs (those SFC that are unaware of SFC information transmitted in accordance with RFC 7665 or using any other proprietary mechanism), an SF-Proxy may be present in the path between an SFF and the SF, which is responsible for removing SFC-header before sending the packet (from the SFF) to the SF, along with re-inserting the SFC-header again when sending the packet (from the SF) to the SFF. In an implementation, the plurality of SFs 120 may have a split-control-plane and user-plane architecture, using Software Defined Network (SDN) principles, or an integrated control and user plane architecture.

In operation, the SFC-O 112 may receive a request for provisioning a service function chain (SFC) of a plurality of service functions (SFs). The request may include at least a flexible SFC template (FST). In an embodiment, the FST includes, but is not limited to, an SF sequence, details of mandatory and optional SFs, conditions associated with the inclusion or exclusion of optional SFs, a matching criteria for SFC, service key performance indicators (KPIs) for selection of SFs for the SFP associated with the SFC.

In an embodiment, the SFC-O 112 may determine an SFP responsive to a receipt of data packets that correspond to a pre-defined flow of data packets to be transmitted over the network. The SFP may be determined based on, but is not limited to, the FST, a current network context, one or more network estimation inputs, and historical network data. The SFC-O 112 may monitor a pre-defined plurality of parameters associated with the SFP and a network context after implementing the SFP. In an embodiment, the pre-defined plurality of parameters include, but are not limited to, a Quality of Service (QoS) parameter, a latency associated with an SFP, a congestion associated with an SFP, a location of a user to whom the data packets are to be transmitted, a type of an access network used for transmission, session characteristics.

In an embodiment, the monitoring may correspond to a periodic monitoring or an aperiodic monitoring. In an embodiment, the periodic monitoring may include determining the pre-defined plurality of parameters periodically based on a configurable time interval, whereas the aperiodic monitoring may include determining the pre-defined plurality of parameters when a trigger is received from one or more network entities communicatively coupled with the SFC-O 112.

The SFC-O 112 may identify a requirement for modification of the SFP based on the SFC-O 112 of the pre-defined plurality of parameters and SFP modification criteria. In an embodiment, the SFP modification criteria includes determining whether a condition for inclusion or exclusion of an SF of the SFP is satisfied, based on one or more service performance thresholds (SPT) and one or more conditions in the provisioning policy (PP) and the current network context. The SFP modification criteria may further include determining whether a change in the pre-defined plurality of parameters based on the monitoring is greater than a pre-defined threshold for parameter change. The SFP modification criteria may further include determining whether the value of at least one of the pre-defined plurality of parameters is greater than its corresponding pre-defined parameter threshold. In an embodiment, the identification may include, but is not limited to, determining whether an SF should be included in the SFP, whether an SF should be excluded from the SFP, and whether the SFP should remain un-modified. A person of ordinary skill in the art will appreciate that based on the identification, zero, one, or a plurality of instances of an SF may be included or excluded from the SFP.

The SFC-O 112 may modify the SFP responsive to the identification. In an embodiment, the modification of the SFP may include, but is not limited to, buffering of data to be transmitted using the SFP to maintain a pre-defined sequence of the data packets. In an embodiment, the modification may be based on a pre-defined SFP modification window. Such a pre-defined SFP modification window may correspond to a configurable time interval for which the modification of the SFP is deferred.

The SFC-O 112 may monitor the performance of the modified SFP based on one or more of the pre-defined plurality of parameters associated with the modified SFP, the network context after modifying the SFP, and a pre-defined plurality of performance thresholds. In an embodiment, the SFC-O 112 may adapt the SFP that has been modified based on the monitoring of the already modified SFP. A person of ordinary skill in the art will appreciate that the aforementioned modification of the modified SFP is intended to convey a recursive nature of modification of an SFP based on the monitoring. In an embodiment, the SFC-O 112 may adapt the SFP modification criteria and the FST, based on the monitored performance of the modified SFP and/or performance of historically modified SFPs. The adaptation is performed based on application of machine learning algorithms on the monitored performance. A person of ordinary skill in the art will further appreciate the aforementioned adaptation is performed after the lifetime of the SFP expires, and not immediately after the confirmation regarding effective modification of the SFP.

It should be noted that the various modules described above may be implemented in programmable hardware devices such as programmable gate arrays, programmable array logic, programmable logic devices, and so forth. Alternatively, the various modules described above may be implemented in software for execution by various' types of processors. An identified module of executable code may, for instance, include one or more physical or logical blocks of computer instructions which may, for instance, be organized as an object, procedure, function, engine, or other construct. Nevertheless, the executables of an identified module need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for transmitting data over a communication network. For example, the exemplary network environment 100 may transmit data over a communication network by the processes discussed herein. In particular, as will be appreciated by those of ordinary skill in the art, control logic and/or automated routines for performing the techniques and steps described herein may be implemented by the network environment 100, either by hardware, software, or combinations of hardware and software. For example, suitable code may be accessed and executed by the one or more processors on the network environment 100 to perform some or all of the techniques described herein. Similarly, application specific integrated circuits (ASICs) configured to perform some or all of the processes described herein may be included in the one or more processors on the network environment 100.

FIG. 2 is a block diagram of exemplary system for adaptively performing service function chaining based on network context, in accordance with some embodiments of the present disclosure. FIG. 2 is explained in conjunction with elements from FIG. 1. With reference to FIG. 2, there is shown the SFC-O 112. The SFC-O 112 may include one or more processors, such as a first processor 202, a second processor 204, a memory 206, a data platform 208, and/or network interfaces 210.

The first processor 202 may include suitable logic, circuitry, interfaces, and/or code that may be configured to execute a set of instructions stored in the memory 206. A person of ordinary skill in the art will appreciate that the first processor 202 may correspond to a set of processors individually configured to perform the functions listed below, and each of the processors in the set of processors may include one or more sub-modules that are specified below. The first processor 202 may include a plurality of sub-modules such as an SFC Catalog Handling module (SFCATHDLR) 212, an SFC Management module (SFCMGR) 214, an SFC Determination module (SFCDM) 216, SFP Determination module (SFPDM) 218, a Network Context Monitoring module (NCM) 220, an SFP QoS Improvement Determination module (SFPQIEM) 222, an SFP Modification Triggering module (SFPMTM) 224, and a Configuration and Administration module (CAM) 226. In an implementation, the first processor 202 may include hardware and connections for that enhance the throughput of a conventional processor. Such a processor may include commercial off the shelf (COTS) hardware with acceleration techniques Examples of the implementation of the first processor 202 may include, but are not limited to, an X86-based processor, a Reduced Instruction Set Computing (RISC) processor, an Application-Specific Integrated Circuit (ASIC) processor, a Complex Instruction Set Computing (CISC) processor, and/or other processors.

The SFCATHDLR 212 may include suitable logic, circuitry, interfaces, and/or code that may be configured to execute a set of instructions stored in the memory 206 for processing information about each of the plurality of SFs $120_1$ to $120_n$ along with their availability status. This input may be provided to the SFPDM 218 during the determination of the SFP. The input may be further provided to an entity such as the SFCDM 216, the SF classifier 116, an SFF of the plurality of SFF 118, and/or a network entity that performs the SF instance determination for a particular SFP. A person of ordinary skill in the art will appreciate that the input to the entity that performs SF instance determination is provided via the SFC-Controller 114. The passed input information is utilized by the respective modules for SF instance determination for a particular SFP.

The SFCMGR 214 may include suitable logic, circuitry, interfaces, and/or code that may be configured to execute a set of instructions stored in the memory 206 for translating the received request for provisioning an SFC into a sequence of SFs between source and destination endpoints. The SFCMGR 214 may be configured to interpret as FST and pass the relevant instructions to the SFCDM 216. The lifecycle of each SFC, and associated SFPs are handled by the SFCMGR 214. The SFCMGR 214 may be further configured to perform lifecycle management of each SFC. The lifecycle management may include on-boarding the FST, instantiating an SFP corresponding to an SFC, scaling the resources associated with an SFC/SFP, terminating one or more SFPs for optimization of resources, and removing the FST from an SFC catalogue.

The SFCDM 216 may include suitable logic, circuitry, interfaces, and/or code that may be configured to execute a set of instructions stored in the memory 206 for translating the received request for provisioning an SFC into a sequence of SFs into one or more programming commands associated with the plurality of SFFs 118. The commands may instruct the SF classifier 116 to classify a pre-defined flow of data and encapsulate it with an appropriate SFC header when reporting it to the SFCDM 216. The SFCDM 216 is further configured to set up SFPs for requests received from SFC-O 112. The SFCDM 216 may be further configured to optimize the SFC to improve resource utilization and QoS. Additionally, the SFCDM 216 may be configured to interpret the SFC inputs received from the SFCMGR 214 and adapt the FST.

The SFPDM 218 may include suitable logic, circuitry, interfaces, and/or code that may be configured to determine an SF from the plurality of SFs 120 whose status is available. The SFPDM 218 may be further configured to translate a sequence of service function constructs into southbound programming commands for the plurality of SFFs 118. The SFPDM 218 may be further configured to determine a sequence of SFFs associated with the determined SFs so as to enforce the flow going through the sequence of identified SFs. The SFPDM 218 may be further configured to determine mandatory or optional SFs for an SFP. The SFPDM 218 may be further configured to adapt SFP based on triggers received from SFPMTM 224. The SFPDM 218 may be further configured to provide instructions to the SFC-Controller 114 to ensure in-sequence delivery of packets during and after the modification of an SFP. The SFPDM 218 may be further configured to avoid making too frequent changes to an SFP based on an SFP modification window.

The NCM 220 may include suitable logic, circuitry, interfaces, and/or code that may be configured to monitor changes in network context for before and after the implementation of the determined SFP. The one or more changes may include, but are not limited to, Radio Bearer QoS changes, change in user location, user mobility and change in Radio Access Technology (RAT) type. In some cases, the inputs on change in context received directly from the NEs or from the SFC-Controller 114 through telemetry.

The SFPQIEM 222 may include suitable logic, circuitry, interfaces, and/or code that may be configured to determine whether any unwanted SFs are present (from optional list of SFs). This may include determining when the QoS/KPI associated with an SF is sufficiently above threshold and/or whether sufficient resources (such as bandwidth) are available. The determination may further include whether there are any redundant SFs and/or SFs which induce result in network overhead. Upon ascertaining that there is an opportunity for removal of certain SFs, the SFPQIEM 222 triggers the SFPDE 218 to adapt the SFP. The SFPQIEM 222 may be further configured to evaluate whether optimization of the determined SFPs is required. Based on the evaluation, the performed optimization leads to minimizing of network resource utilization and reduction in redundancy. The SFPQIEM 222 may be further configured to monitor the SFC performance for a pre-defined duration after the optimization of the SFP has been done to assess whether the optimization has been effective.

The SFPMTM 224 may include suitable logic, circuitry, interfaces, and/or code that may be configured to trigger SFPQIEM 222 based on the information received from the NCM 220 or Network Analytics Engine (NAE). Such a trigger may be provided based on monitoring of one or more thresholds of a plurality of performance thresholds. The SFPMTM 224 may be further configured to provide triggers based on the SFP modification window. The SFPMTM 224 may be further configured to adapt the plurality of thresholds based on the performance of the modified SFP and/or performance of historically modified SFPs. The adaptation is performed based on application of machine learning algorithms on the monitored performance The CAM 226 may include suitable logic, circuitry, interfaces, and/or code that may be configured to collecting relevant Fault Management (FM) and Performance Management (PM) data (such as throughput, resource utilization, and the like) from the SFC path, status, detecting failures, and establishing SFC restoration paths. This function is performed with the help of inputs from the SFC-Controller 114, the Virtual Network Function Monitors (VNFMs), Virtualized Infrastructure Managers (VIMs), and the like.

The second processor 204 may include suitable logic, circuitry, interfaces, and/or code that may be configured to execute a set of instructions stored in the memory 206. A person of ordinary skill in the art will appreciate that the second processor 204 may correspond to a set of processors individually configured to perform the functions listed below, and each of the processors in the set of processors may include one or more sub-modules that are specified below. The second processor 204 may include a plurality of sub-modules such as an SFC/SFP Network Congestion Estimation module (SNCEM) 228, an SFP QoS KPI Estimation module (SQKEM) 230, and/or an SFP Latency Estimation module (SLEM) 232. In an implementation, the second processor 204 may include hardware and connections specialized for processing a large volume of real-time data and producing the results in near-real-time. Examples of the implementation of second processor 204 may include, but are not limited to, an X86-based processor, a Reduced Instruction Set Computing (RISC) processor, an Application-Specific Integrated Circuit (ASIC) processor, a Complex Instruction Set Computing (CISC) processor, and/or other processors. In an implementation, the second processor 204 may be configured with features of entities that include, but are not limited to, database acceleration engines, transactional synchronization extensions, stream processing engines. Such features enable the second processor 204 to perform faster processing of large volume of data along with faster execution of highly complex mathematical and/or statistical operations.

The SNCEM 228 may include suitable logic, circuitry, and/or interfaces that may be configured to estimate SFC/SFP congestion based on traffic flowing through the SFs and the SFCs/SFPs that such SFs are associated with. Such an estimation may be performed based on one or more predictive analysis techniques known in the art.

The SQKEM 230 may include suitable logic, circuitry, and/or interfaces that may be configured to estimate QoS for the SFP based on one or more of inputs received from the Network Data Source Interface Module that is indicative of network conditions and SF KPIs such as latency, packet loss, etc. The estimation is further based on SFP QoS requirements and/or historical data of QoS trends. In an implementation, such historical data trends correlate network conditions and QoS trends for a given set of QoS requirements (or similar QoS requirements), thereby aiding in prediction of QoS for the SFP.

The SLEM 232 may include suitable logic, circuitry, and/or interfaces that may be configured to estimate an end-to-end latency of the determined SFP based on the network conditions, load, and delays incurred on the SFs in the SFP. The estimation is performed based on one or more metrics retrieved from the SFs either via the SFC controller 114 or via the OSS 102. The SLEM 232 may be configured to analyze one or more latency trends to determine a Service Performance Threshold (SPT) crossing, operating range of latency and any abnormal variations (for example, too much toggling/uncertainty, which would lead to jitter). The SLEM 232 may be configured to obtain information of the SFCs and SFPs from the SFC Manager 216, from the data platform 208. Examples of implementation of the memory 204 may include, but are not limited to, Random Access Memory (RAM), Read Only Memory (ROM), Hard Disk Drive (HDD), and/or a Secure Digital (SD) card.

The memory 206 may include suitable logic, circuitry, and/or interfaces that may be configured to store a machine code and/or a computer program with at least one code section executable by the first processor 202 and the second processor 204. In an implementation, the memory 206 may include a volatile memory 234 and non-volatile memory 236. The volatile memory 234 may be configured to store data that include, but are not limited to, adapted thresholds 238, estimation data 240, SF catalog 242, and/or a work area 244 for all temporary and operational data storage related to SFC/SFP orchestration and life cycle management.

The non-volatile memory 236 may include one or more instructions sets for the modules in SFC-O 112. The non-volatile memory 236 may further include data that relates to, but is not limited to, instructions 246, configuration data 248, regulatory and policy information 250, SFC templates 252, historical data 254 associated with provisioned SFPs/SFC, trend and insights data 256 associated with network conditions, and/or QoS of provisioned SFPs.

The data platform 208 may include suitable logic, circuitry, and/or interfaces that may be configured to store large volume of network data in real-time in a fail-safe manner, to enable the aforementioned modules to provide results in a timely manner Examples of implementation of the data platform 208 may include, but are not limited to, cluster-databases, in-memory databases, relational databases, operational databases, a database warehouses, distributed databases, or an end-user databases, known in the art.

The network interfaces 210 may include suitable logic, circuitry, interfaces, and/or code that may be configured to interface with network entities, such as OSS 102, SFC-Controller 114, the plurality of SFs 120, VNFMs, and/or Network Function Virtualized Infrastructure NFVI/VIM. The network interfaces 210 may implement known technologies to support wired or wireless communication. The network interfaces 210 may include, but is not limited to, an OSS interface for interfacing with the OSS 102, an SFC-Controller interface for interfacing with the SFC-Controller 114, VNFM interface for interfacing with the VNFMs, an NFVI/VIM interface for interfacing with the NFVI/VIM, and/or network entity (NE) interface for interfacing with the plurality of NEs such as SFs, virtual network functions (VNF), or physical network functions (PNF).

In operation, the SFCMGR 214 may be configured to receive a request for provisioning an SFC of a plurality of SFs 120. The request comprises at least a flexible SFC template (FST). In an embodiment, the FST comprises at least: an SF sequence, details of mandatory and optional SFs, conditions associated with the inclusion or exclusion of optional SFs, a matching criteria for one or more SFCs, service key performance indicators (KPIs) for selection of SFs for the SFCP associated with the SFCs. The service KPIs may include, but are not limited to, a latency associated with the SFP, a guaranteed throughput and packet drops to enable the SFC-Controller 114 to select the right SFs for the SFC. A person of ordinary skill in the art will appreciate that in an embodiment, the FST may be in an extension of the templates specified in the ETSI Network function Virtualization (NFV) standard ETSI GS NFV-MAN 001.

The SFCMGR 214 may be configured to examine the SFC template in the received request. The SFCMGR 214 may be further configured to extract the information from the SFC template along with creation of an SFC_ORCH_INPUT. In an implementation, the extracted information may include, but is not limited to, a criteria to match a pre-defined flow of data packets with the SFC, mandatory SFs, service KPIs for an SFC (such as latency, packet drops, QoS/throughput compliance), conditions (thresholds, KPIs, events, etc.) that may be associated with the optional SFs (such as a provisioning policy (PP), PP and Service Performance Threshold (SPT), and/or SPT alone).

The SFCMGR 214 may be further configured to transmit the extracted information, along with the SFC_ORCH_INPUT to the SFCDM 216. A person of ordinary skill in the art will appreciate that the SFC_ORCH_INPUT is transmitted to the SFCDM 216 for each new SFC that is provisioned by the SFC-O 112.

In an embodiment, based on the receipt of the SFC_ORCH_INPUT, the SFCDM 216 may be configured to interpret the matching criteria for one or more SFCs for transmission of a pre-defined flow of data packets. Based on the interpretation, the SFCDM 216 may be further configured to translate the interpretation into a plurality of instructions to be executed by the SF classifier 116 that may perform comparison of the provisioned SFC matching criteria with the content of packets that are received from the network. In an embodiment, the criteria may correspond to a Motion Pictures Expert Group (MPEG) video using Transfer Control Protocol (TCP) for a pre-defined class of users at pre-defined times of a day. The SFCDM 216 may be further configured to instruct the SFPDM 218 using the SFC_ORCH_INPUT along with instructing the SF classifier 116 to monitor and report a flow that matches the SFC.

In an embodiment, the SFPDM 218 may be configured to determine the one or more inputs associated with the use of one or more SFs marked as "optional" in the FST. Such one or more inputs may be determined based on a lookup table such as COND_MON_INPUTS_TABLE. In an embodiment, the lookup table (as shown in TABLE 1) may specify one or more conditions along with inputs and the source from which such inputs are to be received for each of the conditions:

TABLE 1

| Conditon | Inputs required |
| --- | --- |
| Access Network latency > pre-defined latency threshold | Access network latency (may be computed from access network Round trip-time (RTT)), latency threshold value |
| Throughput < pre-defined throughput threshold | Actually observed throughput (not allocated values), throughput threshold value |
| Stability of network condition | Network conditions (performance and fault data) for the last 'n' intervals, where 'n' is configurable |

In an embodiment, the SFCMGR 214 may be configured to obtain one or more inputs from the OSS 102 on the sources of inputs indicated in COND_MON_INPUTS_TABLE, and update the non-volatile memory 236 of the SFC-O 112 with this information. The SFCMGR 214 may be further configured to notify the SFPDM 218. The details about the exact source of such inputs may be stored in another table named COND_MON_INPUTS_SRC_TABLE, as depicted by TABLE 2:

TABLE 2

| Inputs required | Source of input |
| --- | --- |
| Access network latency (may be computed from access network Round trip-time (RTT)), latency threshold value | eNodeB, Wi-Fi Access Point |

TABLE 2-continued

| Inputs required | Source of input |
| --- | --- |
| Actually observed throughput (not allocated values), throughput threshold value | Packet Gateway (PGW) for packet core |
| Stability of network condition based on Network conditions (performance and fault data) for the last 'n' intervals, where 'n' is configurable | SFF in the service chaining domain OSS 102 |

Responsive to the aforementioned, the SF classifier 116 may be configured to start monitoring of the incoming pre-defined flows of data packets and when a match occurs, the SF classifier 116 may be configured to send a notification to the SFCMGR 214.

Upon receiving a notification from the SF classifier 116 (via the SFC-Controller 114), the SFCMGR 214 may be configured to trigger the SFPDM 218 to determine an SFP. Further, the determination of the SFP is also responsive to the received data packets (corresponding to a pre-defined flow of data packets) over the network. In an embodiment, the determination of the SFP may be based on one or more of the FST, a current network context, one or more network estimation inputs, and historical network data. In yet another embodiment, the determined SFP may include the one or more SFFs from the plurality of SFFs 118.

The SFPDM 218 may be configured to instantiate the SFP determined by updating an SFC header in the data packets to be transmitted over the SFP. The updated data packets may be transmitted to a first SFF (such as SFF $118_1$) in the determined SFP.

In an embodiment, subsequent to the determination of the SFP, the SFPDM 218 may be configured to inform the SFPMTM 224 of the instantiation of the determined SFP along with the information about the conditions to be monitored. The SFPMTM 224 may be configured to initiate monitoring of the SFP. The monitoring may be based on a pre-defined plurality of parameters associated with the SFP and a network context after implementing the SFP. In an embodiment, the pre-defined plurality of parameters may include, but are not limited to, a Quality of Service (QoS) parameter, a latency associated with an SFP, a congestion associated with an SFP, a location of a user to whom the data packets are to be transmitted, a type of an access network used for transmission, session characteristics. Further, the monitoring of the network context may be performed by the NCM 220 by triggering the concerned network elements and/or functional components including the OSS 102, SFC-O 112, the plurality of SFFs 118, and individual SFs to report SFP specific metrics and data (e.g., SFP latency, latency observed at the individual SFs for the SFP).

In an embodiment, the monitoring corresponds to a periodic monitoring or an aperiodic monitoring. The periodic monitoring may include determining the pre-defined plurality of parameters periodically based on a configurable time interval. The periodic monitoring may entail transmission of the information regarding the SFP to the SNCEM 228, SQKEM 230, and SLEM 232 along with a request for a periodic estimation of the plurality of parameters associated with the SFP. The SNCEM 228, SQKEM 230, and SLEM 232 may be configured to estimate the aforementioned plurality of parameters at pre-configured intervals, such as 'k' (where k could be for e.g., 15 minutes). In an embodiment, the estimation may be performed based on the data stored in the data platform 208 and the inputs provided by the SFPMTM 224. A person of ordinary skill in the art will appreciate that the estimation may be performed based on one or more analytics algorithms using pre-configured parameters, known in the art. The SNCEM 228, SQKEM 230, and SLEM 232 may be configured to update the trend and insights data in the volatile memory 234 and transmit a notification for the update to the SFPMTM 224.

In an embodiment, the aperiodic monitoring may include determining the pre-defined plurality of parameters when a trigger is received from one or more network entities associated with the SFC-O 112. For performing the aperiodic monitoring, the SFPMTM 224 may be configured to continuously track changes in the pre-defined plurality of parameters. Upon receiving an (aperiodic) trigger from network entities that include, but are not limited to, the NCM 220, from the OSS 102, and/or an SF from the plurality of SFs 120 (such as upon unavailability of the SF or a change in access type of the user), the SFPMTM 224 may determine whether it is necessary to trigger the SNCEM 228, SQKEM 230, and SLEM 232 to obtain updated estimates of network conditions, QoS, KPI, and/or latency associated with the SFP. The SFPMTM 224 may be further configured to determine this using an algorithm or a look-up table that is provisioned. For example, in case of a vertical handover from LTE network to a Wi-Fi network, it may be essential to obtain estimates of network conditions in the Wi-Fi network. In case it is necessary to trigger the SNCEM 228, SQKEM 230, and SLEM 232 to obtain updated estimates, the SFPMTM 224 may trigger these modules with the updated information.

Based on the aperiodic or periodic monitoring of the SFP, the SFPMTM 224 may be configured to identify a requirement for modification of the SFP. In an embodiment, the SFP modification criteria includes determining whether a condition for inclusion or exclusion of an SF of the SFP is satisfied, based on one or more service performance thresholds (SPT), one or more conditions in the provisioning policy (PP), and the current network context. The SFP modification criteria may further include determining whether a change in the pre-defined plurality of parameters based on the monitoring is greater than the corresponding pre-defined thresholds of the one or more parameters. The SFP modification criteria may further include determining whether at least one of the pre-defined plurality of parameters are greater than a pre-defined parameter threshold. In an embodiment, the identification may include, but is not limited to, determining whether an SF should be included in the SFP, whether an SF should be excluded from the SFP, and whether the SFP should remain un-modified. A person of ordinary skill in the art will appreciate that based on the identification, zero, one, or a plurality of instances of an SF may be included or excluded from the SFP.

Based on the aforementioned criteria, the SFPMTM 224 may be configured to start a timer, such as SFP_WATCH_TIME (when triggering the SFPDM 218 to modify the SFP), to prevent triggering the SFPDM 218 for SFP modification for the same reason, which is in turn done to avoid frequent modification of the SFP. The SFPMTM 224 may be further configured to trigger the SFPQIEM 222 to monitor the SFP performance (SFP_PERF) for a pre-defined duration (SFP_CHANGE_MONITOR_DURATION) after the SFP has been adapted, and provides details of the modified SFP to the SFPQIEM 222. SFP_PERF could include parameters such as QoS, latency, BER, throughput, etc. The SFPMTM 224 also provides the thresholds for monitoring and reporting (SFP_PERF_THR), and adapts thresholds and rules such as SFP adjustment thresholds (SFPATHR), SFP adjustment event triggers (SFPEVT), SFP adjustment criteria (SFPAC) based on the learning during the lifetime of the SFP. A person of ordinary skill in the art will appreciate the aforementioned adaptation is performed after the lifetime of the SFP expires, and not immediately after the confirmation regarding effective modification of the SFP.

Based on the aforementioned criteria, the SFPMTM 224 may be configured to trigger SFPQIEM 222 to assess if there is any improvement possible in the performance of the determined SFP. In an embodiment, the trigger may be generated when the information received from the NCM 220 exceeds pre-defined performance thresholds, such as the SFPATHR and/or the SFPEVT are fulfilled or are about to be fulfilled. In an embodiment, the SFPEVT may include, but is not limited to, simple events such as change in RAT type, change in mobility state (from stationary to moving or vice versa), change in roaming status, and the like. The change may further include, but is not limited to, a conditional expression involving more than one event triggers, such as change in RAT type AND change in mobility state, change in roaming status OR change in RAT type, and the like. The SFPMTM 224 may be configured to formulate appropriate SFP adjustment criteria (SFPAC) based on the SFPATHR and the SFPEVT. The aforementioned triggering may be based on periodic or aperiodic monitoring.

Upon being triggered, the SFPQIEM 222 may be configured to assess the performance of the SFP based on historical data, the current trigger for change in the SFP, and the network conditions (e.g., load on the SFs in case of a specific SF inclusion/exclusion), the NC. Based on the assessment, the SFPQIEM 222 may identify whether there will be any improvement in the performance upon modifying the SFP. Such an identification is based on assessing the improvements based on the SFP_PERF parameters and their trend during the observation window. The SFPQIEM 222 may be configured to compare each of the SFP_PERF parameters with their corresponding threshold value in SFP_PERF_THR. In case one or more parameters in SFP_PERF is greater than the SFP_PERF_THR, the SFPQIEM 222 may be configured to inform the SFPMTM 224, which in turn, informs the SFPDM 218 appropriately along with the relevant information about the reasons for the modification. In an embodiment, the performance parameters may exceed the SFP_PERF_THR in case of performance degradation upon removal of an SF from the determined SFP. In another scenario, performance parameters may exceed the SFP_PERF_THR when no significant improvement is observed after an SF is included in the determined SFP.

In an embodiment, the SFPDM 218 may be configured to determine when a time when the SFP was last modified. In scenarios when the SFP modification was performed within a pre-defined configurable time interval within which the SFP can be modified. In case the last modification was done within the time interval, the SFPDM 218 may be configured to defer the modification for a pre-defined duration, to avoid toggling and instability due to very frequent modifications to the SFP.

The SFPDM 218 may be configured to modify the SFP based on the FST, taking into consideration the pre-defined plurality of parameters and SFP modification criteria. In an embodiment, the algorithmic steps for modifying the SFP may include, but are not limited to:

Retrieving the FST and scanning each of the plurality of SFs 120 one by one.

In case an SF is marked as optional in the FST, checking what the conditions for modification criteria include.

In case the conditions include:
- PP only→ Determining whether the current network context and pre-defined plurality of parameters fulfill the condition for SF inclusion/exclusion and including/excluding an SF based on the determination.
- PP and SPT→ After checking PP, determining whether the current network conditions and SFP performance are within the SPT for SF inclusion, and including/excluding an SF depending on the determination.
  - Using the adapted values of the SPT during the determination of whether one or more SPT have been violated.
- SPT→ Determining whether the current network conditions and SFP performance are within the SPT for SF inclusion, and including/excluding the SF depending on the outcome of the determination.
  - Using the adapted values of the SPT during the determination of whether one or more SPT have been violated In an embodiment, one optional SF may include multiple conditions associated with it. Consequently, the SFPDM 218 may be configured to check each of the aforementioned conditions one by one. Further, the conditions may also have a linkage to an SF further in the chain or earlier in the chain. In order to handle such scenarios, the SFPDM 218 may be configured to repeat the scanning of SFs and associated conditions for multiple iterations. For example, the PP may indicate that the "TCP_optimizer SF" may be excluded if a "Video_optimizer SF" is included. The SPT may also indicate that the "Video_optimizer SF" may be excluded if the observed throughput is greater than a threshold and/or congestion level is less than a threshold value. In such a scenario, the SFPDM 218 may determine whether the "Video_optimizer SF" has to be included or not in the SFP, based on estimated values of network conditions. Subsequently, the SFPDM 218 may determine whether the "TCP optimizer SF" has to be included or not depending on whether the video optimizer was included.

In an embodiment, upon modification of the SFP, the SFPDM 218 may be configured to inform the SFC-Controller 114 of the modifications to the SFP, so that the plurality of SFFs 118 may be re-programmed accordingly.

In an embodiment, the SFPDM 218 may be further configured to buffer the data packets of the pre-defined flow to ensure delivery of the data packets in accordance with a pre-defined sequence. This becomes especially relevant when one or more SFs are removed from the SFP based on the modification. The in-sequence delivery of the data packets is managed by one or more SFFs from the plurality of SFFs 118. In an exemplary scenario, the data flow in accordance the determined SFP may be:

SFC classifier 116→SFF1→SF1→SFF1→SF2→SFF1→SF3→SFF2→SF4→SFF2→External network,

And the data flow in accordance with the modified SFP may be:

SFC classifier 116→SFF1→SF1→SFF1→SF3→SFF2→SF4→SFF2→External network

The SFF1 ensures (based on the instructions from SFPDM 218) that the last packet passing via SF2 (to SF3) is sent out to SF3 before sending the first packet to SF3 directly after receiving it from SF1. To be able to do this, SFF1 should adequately buffer the packets coming from SF1 by starting an appropriate timer.

In an embodiment, the instructions from the SFPDM 218 may include information corresponding to the SF removed from the SFP when sending instructions to the SFF (SFF1 in this example). The instructions further include measurements corresponding to delay in transmission between the involved SFF and the SF being removed. In an embodiment, such an information may also be present in the SFF itself (SFF1 in this case), however, it may not be the latest. The transmission delay information may be based on the most recently performed measurements performed by the SFPDM 218. The estimation of the transmission delay may be based on past trends. For example, in a scenario, when an upward trend of delay is observed, a linear extrapolation of the past "n" samples could be done to determine the transmission delay.

In an embodiment, the instructions from the SFPDM 218 may include an estimation of a processing delay of the SF being removed, considering the present resource occupancy level of such an SF. This estimation may be based on recent measurements of the processing delay, or may be computed taking into consideration the resource occupancy trend during last 'n' intervals. For example, in case of increasing trend of resource occupancy level in the SF, the most recent measurement of processing delay may be multiplied by a scaling factor proportionate to the rate of increase of resource occupancy level.

Based on the input received from the SFPDM 218 (via the SFC-Controller 114), the relevant SFF (SFF1 in this case) may determine a duration of the timer to be started for the buffering of the packets. The starting of the timer may be based on one or more metrics that include, but are not limited to, the metrics in accordance with the equations (1) to (3):

$$\text{Transmission delay (Tx\_Delay)} = 2 * \text{one way transmission delay between the } SFF \text{ and the } SF \text{ being removed} \quad (1)$$

$$\text{Total Delay} = \text{Estimated processing delay} + \text{Tx\_Delay} \quad (2)$$

$$\text{Timer value} = \text{Total delay} + \text{delta (where delta is an incremental factor that is provisioned)} \quad (3)$$

In an embodiment, after starting the timer value, the SFF may buffer all incoming packets of the pre-defined flow of data packets, belonging to the SFP until the timer expiry. The data packets that correspond to the SF being removed, may not be buffered. They may instead be forwarded to the next hop of the modified SFP. Upon expiry of the timer, the SFF starts forwarding the buffered packets to the next hop of the modified SFP and normal operation of the SFP resumes. In an embodiment, subsequent to transmitting information and appropriate instructions to the SFC-Controller 114 related to the modified SFP, the SFPDM 218 transmits a notification to the SFPMTM 224 regarding the modification of the SFP.

In an embodiment, upon receipt of the notification of modification of the SFP from the SFPDM 218, the SFPMTM 224 may be configured to monitor the performance of the modified SFP. Such monitoring may be based on one or more of the pre-defined plurality of parameters associated with the modified SFP, the network context after modifying the SFP, and a pre-defined plurality of performance thresholds. To accomplish that, the SFPMTM 224 may be configured to start a timer SFP_WATCH_TIMER. Based on the timer, the SFPTMT 224 avoids triggering the modification of the modified SFP again for the same reason a second time while the SFP_WATCH_TIMER is running. Consequently, frequent toggling of SFP is avoided thereby preventing instability and performance degradation.

In an embodiment, the SFPMTM 224 may be configured to instruct the SFPQIEM 222 to monitor the SFP_PERF for the duration provisioned in SFP_CHANGE_MONITOR_DURATION after the SFP had been modified. The SFPMTM 224 may further provide details of the modified SFP to the SFPQIEM 222 along with the SFP_PERF_THR (explained in detail above). The SFPQIEM 222 may be configured to monitor the SFP performance by periodically fetching inputs about the pre-defined plurality of parameters, such as the network conditions, and the performance data such as SFP latency and SFP QoS. The SFPQIEM 222 may then compare them with SFP_PERF_THR. Based on the comparison, the SFPQIEM 222 may whether there is no significant improvement in parameters, such as QoS. In an exemplary scenario, SFPQIEM 222 may determine whether the improvement in QoS is less than the minimum improvement threshold. Such a situation typically arises after insertion of a new SF in the determined SFP. In another exemplary scenario, the SFPQIEM 222 may there is any degradation of latency beyond the threshold. Such a situation typically arises after removal of an SF from the determined SFP. In an embodiment, the result of the comparison is communicated to the SFPMTM 224.

In an embodiment, SFPMTM 224 may be configured to determine the possible reasons for the threshold to be violated, using rules that have been modified based on past learning (ADAPT_REASON_THR_VIOL_RULES). Depending on the determined reason(s), the SFPMTM 224 may be configured to re-determine the SFP using based on the method explained above. Further, the SFPMTM 224 may be configured to adapt the conditions for optional SF exclusion, by updating the SPT by an appropriate factor, such as "step*alpha", where "alpha" corresponds to a pre-defined parameter, and step is incremented each time the SPT is updated due to performance degradation of SFP alone after SFP modification. Further, the SFPMTM 224 may be configured to revert the state of the SFC-O 112 to one which uses minimal network resources. To such end, the SFPMTM 224 may be configured to adapt the conditions for optional SF inclusion described below. A person of ordinary skill in the art will appreciate that the reverting of the state is further performed when SFPMTM 224 determines an increase in network congestion and/or a degradation of network performance.

In an embodiment, the SFPMTM 224 may be configured to re-start the observation timer SFP_CHANGE_MONITOR_DURATION based on violation of the thresholds. The SFPMTM 224 may be further configured to re-determine the SFP and adapt the conditions for optional SF exclusion. Such an adaptation may be performed by adding additional factors, such as appending the SPT with number of SFPs that may be active at a given instant.

In an embodiment, the SFPDM 218 may be configured to determine whether the determined SFP (before modification) or the modified SFP consumes more network resources by taking into consideration the sum of processing and transmission resources of the respective NEs. In case of multiple SFs are inserted or removed, the SFPDM 218 may be configured to determine a configuration that utilizes uses the minimum network resources after considering all possible combinations of the SFs being inserted or removed. As an example, consider a scenario where an "SF_A" is inserted and an "SF_B" is removed. The SFPDM 218 may be configured to determine the network resources when the "SF_A" alone is inserted, and "SF_B" alone is removed, when the "SF_A" is inserted AND "SF_B" is removed, and when the "SF_A" is NOT inserted AND the "SF_B" is intact (not removed).

In an embodiment, the SFPQIEM 222 may be configured to update the non-volatile memory 236 about the changes in ADAPT_REASON_THR_VIOL_RULES based on the monitoring of the monitored performance of the modified SFP and/or performance of historically modified SFPs. The adaptation is performed based on application of machine learning algorithms on the monitored performance. For example, in an exemplary scenario, if the current set of rules had a certain non-correlating factor, it is removed from the rules. The SFPDM 218 may be further configured to update the non-volatile memory 236 with the changes in the pre-defined performance thresholds and configurable time interval for which the modification of the SFP is deferred.

In an embodiment, the SFPDM 218 may be configured to update the FST based on the monitoring of the SFP. The SFPDM 218 may be further configured to trigger the SFCDM 216 with the updates to the FST based on the changes done during the SFP operation. The SFCDM 216 may be configured to take an average over 'n' SFP operations (where 'n' is configurable) before updating the FST in the non-volatile memory 236 of the SFC-O 112. Once the FST is modified in the non-volatile memory 236, the modified FST shall be used for all future SFCs. The SFCDM 216 may be configured to determine the stability of the proposed changes to the FST before actually making the changes. In an embodiment, if the proposed change is ascertained to be unstable, i.e., the change had been done during the SFP operation but was reverted soon afterwards, then the SFCDM 216 may decide not to make the proposed change to the FST.

A person of ordinary skill in the art will appreciate that the architecture of the SFC-O 112 disclosed above enables dynamic programmability of a user-plane (SFC and hence also SFP) for user specific SFC instantiation. The control logic for such programmability may rest in the SFC-O 112 and the SFC-Controller 114. Further, with respect to the architecture and realization of the SFC functionality, in an embodiment, the SFP determination may be done completely done by the SFC-O 112 in a centralized manner, including selection of individual SF instances (in case there is a plurality of instances of a specific SF). In another embodiment, the SFP determination may be done partially by the SFC-O 112 and partially by the SF classifier 116 and/or an SFF of the plurality of SFFs 118. In such an embodiment, the SFC-O 112 may determine the SFs to be included in the SFP, and the SF instance selection may be performed by the SF classifier 116 and/or the SFF, based on instructions from the SFC-O 112, which may consider the plurality of parameters. In yet another embodiment, the SFP determination may be done completely by the SF classifier 116, based on inputs and instructions received from the SFC-O 112. In yet another embodiment, the SFP determination may be partially done by the SF classifier 116 and the SFF, with the SF classifier 116 determining the SFs to be included, and the SFF determining the SFC instances.

FIGS. 3A and 3B collectively depict a flow diagram of a detailed exemplary process for adaptively performing service function chaining based on network context, in accordance with some embodiments of the present disclosure. With reference to FIG. 3, there is shown a flow chart 300. The flow chart 300 is described in conjunction with FIGS. 1 and 2. The process starts at step 302 and proceeds to step 304.

At step 304, a request for provisioning an SFC of a plurality of SFs 120 is received by the SFC-O112. The request comprises at least an FST. At step 306, a trigger is received for creation of an SFP responsive to the received request. The trigger may be based on the SFC_ORCH_INPUT as explained in detail in FIG. 2.

At step 308, an SFP is determined responsive to a receipt of data packets corresponding to a pre-defined flow of data packets to be transmitted over the network. The SFP may be determined based on at least the FST, a current network context, one or more network estimation inputs, and historical network data.

At step 310, monitoring of a pre-defined plurality of parameters associated with the determined SFP and a network context after implementing the SFP, may be initiated. The monitoring may correspond to a periodic monitoring or an aperiodic monitoring. At step 312, a requirement for modification of the SFP based on the monitoring of the pre-defined plurality of parameters and SFP modification criteria, may be identified.

At step 314, the determined. SFP may be modified based on the identification. At step 316, the performance of the modified SFP may be monitored to assess the effectiveness of the modification. Such monitoring may be based on tracking of the pre-defined plurality of parameters associated with the modified SFP, the network context after modifying the SFP, and a pre-defined plurality of performance thresholds.

At step 318, it may be determined whether the modification was effective. In scenarios when the modification was effective, the control passes to the step 320. In scenarios when the modification was effective, the control passes to the step 312. At step 320, adapt the SFP modification criteria and the FST, based on the monitored performance of the modified SFP and/or performance of historically modified SFPs. A person of ordinary skill in the art will appreciate the aforementioned adaptation is performed after the lifetime of the SFP expires, and not immediately after the confirmation regarding effective modification of the SFP. The control passes to end step 322.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer. Referring now to FIG. 4, a block diagram of an exemplary computer system 401 for implementing embodiments consistent with the present disclosure is illustrated. Variations of computer system 401 may be used for implementing network environment 100 for transmitting data over a communication network. Computer system 401 may include a central processing unit ("CPU" or "processor") 402. Processor 402 may include at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM47501UB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 409, 410, and 411. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., past ticket repository, keywords, Ngrams, clusters or categories, relationship mapping, user queries, resolutions, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for adaptively performing service function chaining based on network context, thereby performing dynamic Service chain formation that is adaptive to the prevalent network conditions, user mobility, availability of alternate access-network(s), etc. while maintaining the desired QoS and limiting network resource overhead.

The specification has described system and method for adaptively performing service function chaining based on network context. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of adaptively performing service function chaining based on network context, the method comprising:
    receiving, by a network device, a request for provisioning a service function chain (SFC) of a plurality of service functions (SFs), wherein the request comprises at least a flexible SFC template (FST);
    determining, by the network device, a service function path (SFP) responsive to a receipt of data packets to be transmitted over the network, based on at least the FST, a current network context, one or more network estimation inputs, and historical network data, wherein the data packets correspond to a pre-defined flow of data packets;
    monitoring, by the network device, a pre-defined plurality of parameters associated with the SFP and a network context after implementing the SFP, wherein the monitoring corresponds to a periodic monitoring or an aperiodic monitoring;
    identifying, by the network device, a requirement for modification of the SFP, during the lifetime of the SFP, based on the monitoring of the pre-defined plurality of parameters and SFP modification criteria, wherein the SFP modification criteria comprises: determining whether an SF should be included in the SFP, whether an SF should be excluded from the SFP, whether the SFP should remain un-modified during the lifetime of the SFP;
    modifying, by the network device, the SFP responsive to the identification based on a pre-defined SFP modification window within the lifetime of the SFP, wherein the SFP modification window corresponds to a configurable time interval for which the modification of the SFP is deferred; and
    monitoring, by the network device, the performance of the modified SFP based on one or more of the pre-defined plurality of parameters associated with the modified SFP, the network context after modifying the SFP, and a pre-defined plurality of performance thresholds.

2. The method of claim 1, further comprising adapting the SFP modification criteria and the FST, based on the monitored performance of the modified SFP and/or performance of historically modified SFPs, and wherein the adaptation is performed based on application of machine learning algorithms on the monitored performance.

3. The method of claim 1, wherein the modification of the SFP comprises buffering of data to be transmitted using the SFP to maintain a pre-defined sequence of the data packets.

4. The method of claim 1, wherein the periodic monitoring comprises determining the pre-defined plurality of parameters periodically based on a configurable time interval.

5. The method of claim 1, wherein the aperiodic monitoring comprises determining the pre-defined plurality of parameters when a trigger is received from one or more network entities associated with the network device.

6. The method of claim 1, wherein the pre-defined plurality of parameters comprise one or more of: a Quality of Service (QoS) parameter, a latency associated with an SFP, a congestion associated with an SFP, a location of a user to whom the data packets are to be transmitted, a type of an access network used for transmission, session characteristics.

7. The method of claim 1, wherein the SFP modification criteria further comprises:
    determining whether a condition for inclusion or exclusion of an SF of the SFP is satisfied, based on one or more service performance thresholds (SPT), one or more conditions in the provisioning policy (PP), and the current network context,
    determining whether a change in the pre-defined plurality of parameters based on the monitoring is greater than a pre-defined threshold for parameter change, and
    determining whether at least one of the pre-defined plurality of parameters are greater than a pre-defined parameter threshold.

8. The method of claim 1, further comprising adapting the modified SFP based on the monitoring of the modified SFP.

9. A system for adaptively performing service function chaining based on network context, the system comprising:
    a processor; and
    a memory communicatively coupled to the processor, wherein the memory stores the processor-executable instructions, which, on execution, causes the processor to:
    receive a request for provisioning a service function chain (SFC) of a plurality of service functions (SFs), wherein the request comprises at least a flexible SFC template (FST);
    determine a service function path (SFP) responsive to a receipt of data packets to be transmitted over the network, based on at least the FST, a current network context, one or more network estimation inputs, and historical network data, wherein the data packets correspond to a pre-defined flow of data packets;
    monitor a pre-defined plurality of parameters associated with the SFP and a network context after implementing the SFP, wherein the monitoring corresponds to a periodic monitoring or an aperiodic monitoring;
    identify a requirement for modification of the SFP, during the lifetime of the SFP, based on the monitoring of the pre-defined plurality of parameters and SFP modification criteria, wherein the SFP modification criteria comprises:
    determining whether an SF should be included in the SFP, whether an SF should be excluded from the SFP, whether the SFP should remain un-modified during the lifetime of the SFP;
    modify the SFP responsive to the identification based on a pre-defined SFP modification window within the lifetime of the SFP, wherein the SFP modification window corresponds to a configurable time interval for which the modification of the SFP is deferred; and
    monitor the performance of the modified SFP based on one or more of the pre-defined plurality of parameters associated with the modified SFP, the network context after modifying the SFP, and a pre-defined plurality of performance thresholds.

10. The system of claim 9, wherein the processor is further configured to adapt the SFP modification criteria and the FST, based on the monitored performance of the modified SFP and/or performance of historically modified SFPs, and wherein the adaptation is performed based on application of machine learning algorithms on the monitored performance.

11. The system of claim 9, wherein the modification of the SFP based on buffering of data to be transmitted using the SFP to maintain a pre-defined sequence of the data packets.

12. The system of claim 9, wherein the periodic monitoring comprises determining the pre-defined plurality of parameters periodically based on a configurable time interval, and wherein the aperiodic monitoring comprises determining the pre-defined plurality of parameters when a trigger is received from one or more network entities associated with the network device.

13. The system of claim 9, wherein the SFP modification criteria further comprises:
   determining whether a condition for inclusion or exclusion of an SF of the SFP is satisfied, based on one or more service performance thresholds (SPT), one or more conditions in the provisioning policy (PP), and the current network context,
   determining whether a change in the pre-defined plurality of parameters based on the monitoring is greater than a pre-defined threshold for parameter change, and
   determining whether at least one of the pre-defined plurality of parameters are greater than a pre-defined parameter threshold.

14. The system of claim 9, wherein the processor is further configured to adapt the modified SFP based on the monitoring of the modified SFP.

15. A non-transitory computer-readable medium storing instructions for adaptively performing service function chaining based on network context, wherein upon execution of the instructions by one or more processors, the processors perform operations comprising:
   receiving a request for provisioning a service function chain (SFC) of a plurality of service functions (SFs), wherein the request comprises at least a flexible SFC template (FST);
   determining a service function path (SFP) responsive to a receipt of data packets to be transmitted over the network, based on at least the FST, a current network context, one or more network estimation inputs, and historical network data, wherein the data packets correspond to a pre-defined flow of data packets;
   monitoring a pre-defined plurality of parameters associated with the SFP and a network context after implementing the SFP, wherein the monitoring corresponds to a periodic monitoring or an aperiodic monitoring;
   identifying a requirement for modification of the SFP, during the lifetime of the SFP, based on the monitoring of the pre-defined plurality of parameters and SFP modification criteria, wherein the SFP modification criteria comprises:
   determining whether an SF should be included in the SFP, whether an SF should be excluded from the SFP, whether the SFP should remain un-modified during the lifetime of the SFP;
   modifying the SFP responsive to the identification based on a pre-defined SFP modification window within the lifetime of the SFP, wherein the SFP modification window corresponds to a configurable time interval for which the modification of the SFP is deferred; and
   monitoring the performance of the modified SFP based on one or more of the pre-defined plurality of parameters associated with the modified SFP, the network context after modifying the SFP, and a pre-defined plurality of performance thresholds.

* * * * *